United States Patent [19]

Sitte

[11] Patent Number: 5,469,150
[45] Date of Patent: Nov. 21, 1995

[54] SENSOR ACTUATOR BUS SYSTEM

[75] Inventor: Hans J. Sitte, Freeport, Ill.

[73] Assignee: Honeywell Inc., Minneapolis, Minn.

[21] Appl. No.: 364,061

[22] Filed: Dec. 27, 1994

Related U.S. Application Data

[63] Continuation of Ser. No. 993,831, Dec. 18, 1992, abandoned.

[51] Int. Cl.$^6$ .......................... G08C 19/16; G05B 23/02; H04J 3/14
[52] U.S. Cl. .................................... 340/825.07; 370/85.1; 340/870.01
[58] Field of Search ...................... 340/825.07, 825.06, 340/870.01, 870.16, 870.17, 340 R, 310 A, 825.08; 371/8.2; 370/85.1

[56] References Cited

U.S. PATENT DOCUMENTS

| | | | |
|---|---|---|---|
| 4,374,333 | 2/1983 | Avery | 327/77 |
| 4,677,308 | 6/1987 | Wroblewski et al. | 307/10.1 |
| 4,791,311 | 12/1988 | Vig | 340/459 |
| 5,163,048 | 11/1992 | Heutink | 370/94.1 |
| 5,200,743 | 4/1993 | St. Martin et al. | 340/825.07 |
| 5,323,385 | 6/1994 | Jurewicz et al. | 370/85.1 |

OTHER PUBLICATIONS

"Logging on Nets", Electrical/Electronic Engineering and Technology Guide, (one page) *machine Design Magazine*, Jan. 1993.

Primary Examiner—Thomas G. Black
Assistant Examiner—David Tiuk Jung
Attorney, Agent, or Firm—William D. Lanyi

[57] ABSTRACT

A four-wire bus is provided with a two-wire power bus and a two-wire signal bus and a plurality of sensors and actuators attached to both two-wire busses. A modification is provided to the standard CAN protocol developed and provided by Robert Bosch GmbH, in which the standard CAN header, of a data packet is modified to incorporate a shortened device identifier priority. By shortening the identifier field of the CAN header three bits are made available for use as a short form protocol data unit which can be used to contain binary information representing both the change of status of an identified device and the current status of the device. The same three-bit PDU can be used to acknowledge receipt of the change of status information. In order to retain all of the beneficial capabilities of the standard CAN protocol, the three-bit short form PDU can also be used to identify the use of additional bytes of a data field so that a device can take advantage of the more complex capabilities of the standard CAN protocol. However, in situations where a mere change of status report is sufficient, the present invention reduces the length of a message from a minimum of three bytes to a length of two bytes to obtain the significant benefits of increased speed of message transmission.

11 Claims, 7 Drawing Sheets

| 0 | 0 | 0 | COS OFF |
| 0 | 0 | 1 | COS ON |
| 0 | 1 | 0 | COS OFF ACK |
| 0 | 1 | 1 | COS ON ACK |
| 1 | 0 | 0 | WRITE OFF |
| 1 | 0 | 1 | WRITE ON |
| 1 | 1 | 0 | WRITE OFF ACK |
| 1 | 1 | 1 | WRITE ON ACK |

SENSOR ACTUATOR BUS SYSTEM

This application is a continuation of application Ser. No. 07/993,831 filed on Dec. 18, 1992, now abandoned.

BACKGROUND OF THE INVENTION

1. Field of the Invention

The present invention relates generally to a sensor actuator bus and, more particularly, to an information communication system for use with a plurality of devices, such as sensors or actuators, which permits rapid communication of sensor status between devices connected in signal communication with the bus. U.S. patent application Ser. No. 07/993,180, which was filed on Dec. 18, 1992, by Sitte and assigned to the Assignee of the present application, relates to a sensor actuator bus such as that which is the subject of the present application.

2. Description of the Prior Art

When a plurality of sensors or actuators are associated together to provide a control system, such as an assembly line or other type of manufacturing equipment, which requires numerous sensing and actuating devices, each device could possibly be connected individually to a central controller such as a programmable logic controller (PLC). However, since two wires would be extended between each device and the PLC, the amount of wiring needed to accomplish this function becomes economically prohibitive if a large number of sensors and actuators are involved in the system. Since each sensor or actuator requires both the provision of electrical power and a means for transmitting signals to and from the device, it is conceivable that four wires could be used to connect each of the sensing or actuating devices to both a power supply and a central controller. However, as is known to those skilled in the art, several means have been developed in an attempt to avoid this costly approach.

U.S. Pat. No. 4,374,333, which issued to Avery on Feb. 15, 1983, discloses a two terminal Hall sensor which is incorporated in an integrated circuit. The integrated circuit also comprises a voltage regulator and a threshold detector. DC power is supplied to the circuit through a pair of terminals that may be connected to a remote DC voltage source. A switchable constant current sink circuit connected across the terminals is turned on and off in response to the two output states of the threshold detector that, in turn, is responsive to the Hall sensor output voltage. Thus, the DC current flowing in the two DC supply lines is a predictable and recognizable value corresponding to a low or high magnitude magnetic field at the sensor. The magnitudes of the current flowing in the two DC supply lines is therefore recognizable even when the DC supply voltage changes over a wide range.

U.S. Pat. No. 4,791,311, which issued to Vig on Dec. 13, 1988, discloses an integrated circuit sensor that is capable of being energized through two DC terminals of the integrated circuit. Each sensor, when connected in parallel so as to be energized from a single DC supply voltage source, is capable of recognizing a unique pulse signal code superimposed on the DC supply voltage. When the sensor recognizes its code on the two-wire bus, it powers up its transducer, such as a Hall element and responds by drawing a particular current pattern from the common DC voltage source which is indicative of the presence or absence of a magnetic field that is ambient to the sensor. Electrically controlled energy to the transducer is provided only when the unique code is present on the two-wire bus. The steady regulated output voltage supplies energy to the MOS logic including the address code comparator. The sensor quiescent current drawn from the DC voltage supply line is thereby caused to be a very low value which becomes increasingly advantageous as more and more sensors are operated in parallel on the same DC supply line.

U.S. Pat. No. 4,677,308, which issued to Wroblewski et al on Jun. 30, 1987, discloses a switch status monitoring system. The system described in the Wroblewski et al patent provides continuous status monitoring of a plurality of switches and smart sensors associated with the switches, wherein each sensor is connected to a separate single point on a single-wire bus. The monitoring is affected by a smart sensor multiplex arrangement. The arrangement employs a microcomputer and a driver and receiver circuit for developing a particular pulse train wave form which is placed on the bus to provide power and control voltage signals to the plurality of smart sensors. The smart sensors contain circuits that respond to the waveform in a manner that causes each smart sensor to send current signals back over the single wire bus to the driver and receiver circuit and the microcomputer during designated repetitive and sequential time slots. The driver and receiver circuit receives, interprets and converts the current signals into voltage signals used by the microcomputer for establishing a history of the status of the bus, the sensors and the switches. The micro computer supplies continuous and updated information to a display system indicative of the status of each sensor and its associated switch.

The Avery, Vig and Wroblewski et al patents, described immediately above, are three examples of communication systems which are associated with a two-wire bus, or a one-wire bus with a ground connection as described in the Wroblewski et al patent, which communicates status information from a plurality of sensors or switches connected to the bus. It should be understood that these two-wire communication systems are representative of many other such systems that are very well known to those skilled in the art. It should also be understood that these two-wire communication systems each exhibit a common disadvantage because each of these three systems requires that each device connected to the system by polled sequentially and that each device only communicate its status when it is polled. This type of communication system typically provides a series of pulses on the two-wire bus and each device connected to the bus counts the pulses until the total sum equals its assigned identification value. If one of the sensors changes state much more often than the other sensors, this type of communication system does not provide a way to accommodate this situation. The sensors cannot, on their own, initiate a transmission in which the sensor communicates its status or change of state to a central controller and, in addition, the central controller has no convenient way to request a status from one specific sensor without first interrogating each device which has a priority identification with a binary number less than the specific device whose status is to be interrogated.

Many different protocols have been developed to permit efficient communication between individual devices, such as sensing and actuating apparatus, and a central control device, such as a PLC. One communication protocol that is particularly well suited for use in systems of the type described above is the Controller Area Network (CAN) that has been developed by Robert Bosch GmbH. The details of the CAN protocol are described in the 1991 revision of the CAN specification, versions 1.2 and 2.0, which is explicitly incorporated by reference herein. The CAN protocol provides a serial communication system that efficiently supports distributed real time control of a plurality of devices with a very high level of security. It can be used in association with high speed networks or low cost multiplex wiring systems. In certain automotive applications, such as electronics, engine control units, sensors or anti-skid systems, the CAN protocol supports bit rates up to the 1 Mbit/sec while maintaining a cost effective method that can be incorporated into vehicle body electronics such as lamp clusters, electric windows, etc. without requiring complex wiring harnesses. Some applications incorporate a microprocessor in association with a CAN protocol chip and several sensors are usually connected in signal communication with the microprocessor. As an example, a single microprocessor can be associated with a pressure sensor, a temperature sensor and a photoelectric device. All three sensors would be connected to ports of the single microprocessor. In addition, the CAN protocol chip would be connected to both the microprocessor and the two-wire bus. The microprocessor would receive signals from the three sensors, determine the source of the signal and formulate a message for transmission by the CAN protocol chip to the two-wire bus.

The CAN protocol incorporates eleven bits that act as a priority code to identify a particular device connected to the two-wire bus. As is understood by those skilled in the art, the eleven priority code bits of the CAN protocol system can be used to identify a particular device in the system or, alternatively, can be used to identify a particular message. For example, in certain systems there might only be one temperature sensor. The priority bits in the CAN protocol could be used to identify a particular message that represents an overtemperature condition. In that case, there is no need to identify the device that caused the message to be generated since only one device could have generated it. On the other hand, if many identical sensors are connected to the system, the eleven priority bits would be used as an identifier field to specify particular sensors. A 12th bit in the bit stream operates as a Remote Transmit Request (RTR) which designates that a remote device should transmit a message. The following two bits are reserved for use by the CAN system. The CAN protocol next provides four bits that define the length of a following data field. The data field is limited to eight bytes, or sixty-four bits, of information.

A system incorporating a protocol such as the CAN protocol operates in a highly efficient and satisfactory manner for most systems, particularly when extremely high data rates are not required. More specifically, sensor and control systems in an automotive application are particularly well suited for use with the standard CAN protocol. However, certain applications can require rates of data exchange beyond those that can be easily accommodated by the CAN protocol. For example, certain industrial applications incorporate a very large number of sensors, such as limit switches, proximity sensors, photoelectric devices, etc.. In addition, an industrial system may incorporate a large number of actuators such as solenoids, air cylinders, etc.. The statuses of each of the sensors connected to a two-wire bus of this type in an industrial application can change randomly and at a very rapid rate. Since the CAN protocol requires that each device connected to the bus be given a priority value which can be used as the device identifier, the application of a large number of sensors and actuators to a bus can result in deleterious delays in communicating the status of low priority devices to a central controller, such as a PLC.

Although the CAN protocol provides a highly efficient and powerful method for communicating information between devices on a bus, it would be beneficial to the field of industrial automation if certain types of information could be communicated at a greater rate of transmission than is normally contemplated by the CAN protocol. This is particularly true in certain industrial automation systems which incorporate many devices, such as limit switches, proximity sensors and photoelectric devices, which can exhibit only one of two possible states (e.g. open/closed, on/off, present/absent). It would therefore be beneficial if devices such as these could transmit their status in a streamlined way that shortens the time needed for the transmission of data using the standard CAN protocol.

SUMMARY OF THE INVENTION

The present invention provides an adaptation of the standard CAN protocol which significantly reduces the number of data bits that are necessary to transmit the status of devices which typically exhibit only two states. An important advantage of the present invention is that it can operate within the overall CAN protocol structure so that the capability of transferring more complex messages survives and is available when needed. The particular adaptation of the standard CAN protocol provided by the present invention, however, significantly shortens the length of the serial bit stream in a CAN transmission in the vast majority of instances when a two-state device connected to the bus merely needs to transmit its status to another device connected in signal communication with the bus. In other words, a limit switch can transmit its change of state from an open status to a closed status much more quickly through the use of the present invention than through the use of the standard CAN protocol. However, when the need arises to transfer a complex message such as a fault condition, the standard CAN protocol can be implemented and the adaptation of the CAN protocol provided by the present invention does not adversely interfere with that capability.

In a preferred embodiment of the present invention, the bus comprises a two-wire power bus and a two-wire communication bus. The power bus provides power for all of the devices connected to it, such as proximity sensors, photoelectric detectors, limit switches, temperature sensors and other types of switches, sensors or actuators which are connected in parallel across the two wires. These devices could also be pressure sensors and mass airflow sensors. If the devices are smart devices, they are connected directly to the two-wire communication bus. If they are not smart devices, they can be connected to the two-wire communication bus through a smart node device which will be described in greater detail below.

In a preferred embodiment of the present invention, an information communication system is provided which comprises a four-wire bus with two signal wires and two power supplying wires. In addition, at least one device is connected in signal communication with the four-wire bus which comprises a means for transmitting a data packet between the bus and the first device. It should be understood that the data packet can be transmitted by the first device to the bus or, alternatively, transmitted by a similarly configured second device to the bus. In that case, the message would be received from the bus by the first device.

The data packet comprises a plurality of bits which, in turn, comprises a direction bit, seven identifier bits and three message bits. The identifier bits represent a priority code that identifies a particular device connected to the bus. The priority code, in conformance with the operation of the standard CAN protocol, determines the priority of each device connected to the bus and makes possible an efficient and effective arbitration scheme for preventing confusion when more than one device simultaneously transmits a message onto the bus.

The direction bit in the data packet represents the source of the data packet. In other words, it identifies whether the message is emanating from the device identified in the priority code or transmitted from another device to the identified device. The message bits represent information being transmitted by the data packet, either to or from the device identified by the priority code.

In a preferred embodiment of the present invention, the information communication system further comprises a second device connected in signal communication with the bus. In addition, a second means for transmitting a second data packet is associated with the second device and the second data packet is configured exactly the same as the first data packet. It should be understood that the identical configuration of the data packet transmitted by or to the second device does not imply that the information contained therein is identical. Instead, this terminology indicates that the arrangement of the plurality of bits in the data package into a direction bit, seven identifier bits and three message bits is the same arrangement in all data packets. Naturally, the value of each individual bit in the data packet can differ from message to message as a function of the associated device identified by the priority code, the direction of the transmission and the actual message being transmitted. In industrial control systems which utilize the present invention, the first device can be a proximity sensor, a photoelectric sensor, a limit switch, a temperature sensor or virtually any other type of sensor or actuator. In addition, the second device connected in signal communication with the bus can be a programmable logic controller.

Although the basic data packet of the present invention incorporates two bytes of information within the overall structure of the CAN protocol, it should be understood that a data packet configured in accordance with the present invention can also expand to conform to the standard data packet contemplated by the CAN protocol. In other words, even though the designation of the bits in the two preconfigured bytes of the data packet differ significantly from the corresponding two bytes in a CAN protocol data packet, they can still be used to identify a subsequent bit stream that represents a data field having a length of eight bytes or less. Although the present invention contemplates both an RTR field and a data length code set equal to zero, with no subsequent data field in the data packet, the present invention permits the insertion of a nonzero value in the data length code followed by a data field when circumstances demand this approach. This permits a device connected in signal communication with the bus to transmit messages that are more complex than the simple status message described above. Although the speed advantages provided by the present invention would not be provided by this more standard approach, the option of providing both standard messages and the provision for faster shortened messages is a significant advantage that makes available both the speed of the present invention and the flexibility of the standard CAN protocol. Although the longer standard CAN protocol message is known to those skilled in the art and is therefore not part of the present invention, one of the advantages of the present invention is that it does not preclude or prohibit the use of the slower, but occasionally advantageous, standard CAN protocol. The use of the data field permits a device to transmit fault conditions that are more complex than a shortened status report and, in addition, makes possible the implementation of devices which report analog values. As an example, a temperature detector could possibly be used in either one of the two ways described above. If a threshold value is provided to the temperature detector, it can report a two-state condition that only describes whether or not the measured temperature exceeds the threshold value by utilizing the shortened data packet of the present invention. Alternatively, the temperature detector could report the actual measured temperature by inserting an analog value in the data field and using the standard CAN protocol methodology.

The primary advantage of the present invention is the speed that it achieves by providing a modified protocol which only uses a portion of two bytes of the data packet to describe the status of the associated device and therefore does not require the additional data field anticipated by the CAN protocol. In other words, while the standard CAN protocol uses two bytes of a bit stream, or data packet, to identify the priority of a device connected to a two-wire bus and as an index pointer to describe the length of an attached data field, the present invention transmits the entire status message within the same two bytes of the data packet and therefore eliminates the need for any data field during abbreviated transmissions of device statuses.

In operation, a device incorporating the present invention utilizes a method of communicating information between itself and a second device connected to a bus in which the steps of the method comprise transmitting a series of data bits from its own transmitting means to the two-wire bus, setting a first group of the series of data bits to a value representing a preselected device identifier and setting a second group of the series of data bits to a pattern representing a change of its status. The second group of the series of data bits represents both the occurrence of a status change and the nature of the current status.

BRIEF DESCRIPTION OF THE DRAWINGS

The present invention will more fully understood from a reading of the Description of the Preferred Embodiment in conjunction with the drawings, in which.

DESCRIPTION OF THE PREFERRED EMBODIMENT

Figure 1:
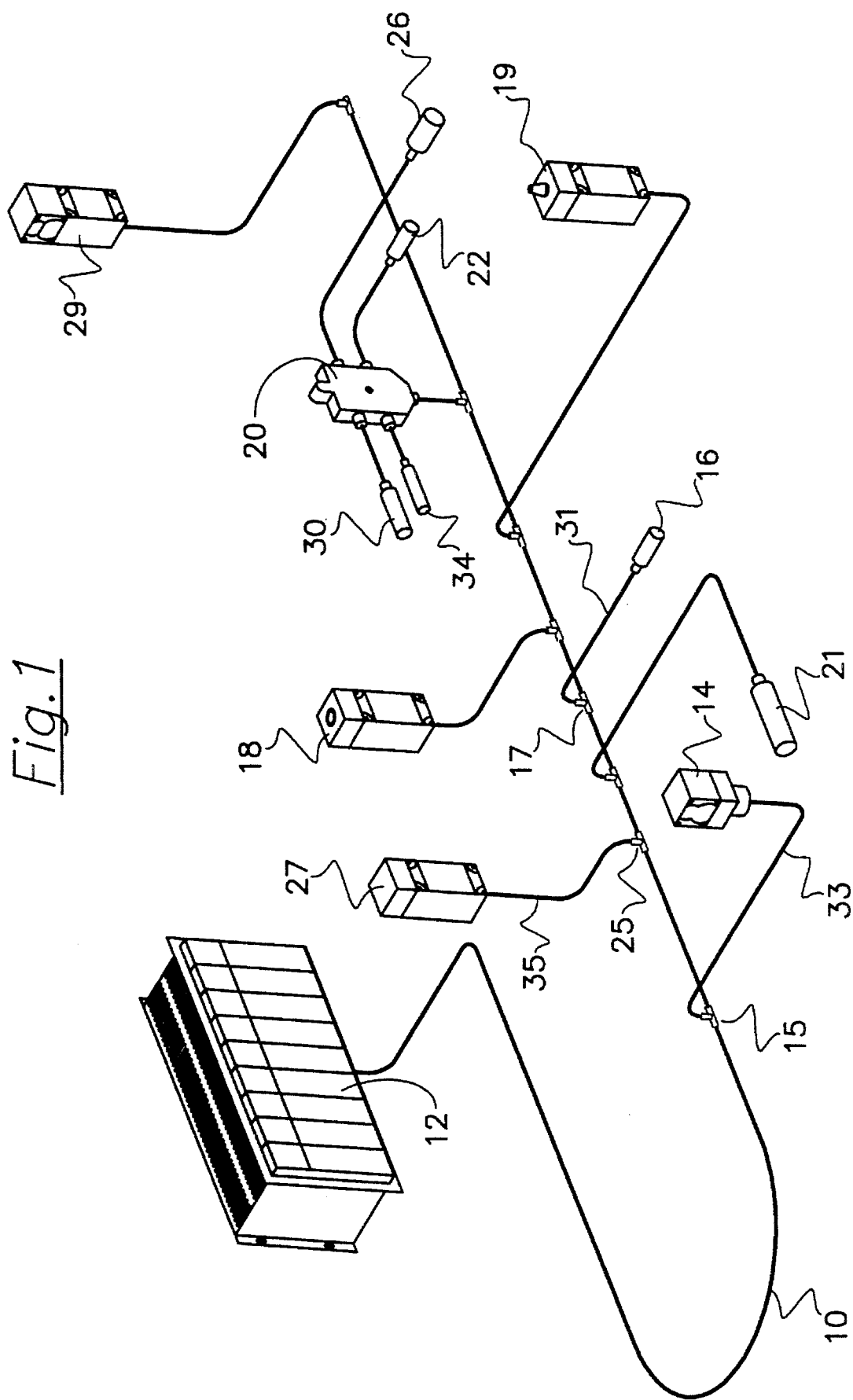
FIG. 1 illustrates an exemplary sensor actuator bus incorporating the concepts of the present invention.

Throughout the Description of the Preferred Embodiment of the present invention, like reference numerals will be used to identify like components. FIG. 1 illustrates a sensor actuator bus (SAB) made in accordance with the present invention. A cable 10, comprising a two-wire power bus and a two-wire communication bus therein, connects a programmable logic controller (PLC) 12 to a plurality of devices that are each connected in signal communication with the two-wire communication bus and in power transmitting relation with the two-wire power bus. Throughout the following description, it should be realized that certain devices connected in signal communication with the two-wire communication bus are of the type commonly referred to as smart devices. This terminology is used to describe devices which incorporate a microprocessor and have the capability of formulating and transmitting data packets to the two-wire communication bus. In addition, this terminology implies the capability of receiving messages from the two-wire communication bus in certain applications, such as when the device is an actuator that responds to commands from the PLC 12. The sensor actuator bus provided by the present invention is also capable of accommodating standard devices which do not have the capability of formulating and transmitting messages. As will be described in greater detail below, these standard devices can be connected to the two-wire communication bus through an intelligent multiport interconnect system.

With reference to FIG. 1, two photoelectric devices, 14 and 16, are connected directly to the bus. These two smart photoelectric devices are provided with the capability of formulating messages and transmitting those messages directly to the two-wire communication bus for receipt by the PLC 12. In addition, a pair of smart proximity sensors, 18 and 21, are similarly connected directly to the bus.

To permit the present invention to be used in association with devices which do not have the capability of formulating, transmitting or receiving data packets, an intelligent multiple port interconnect system 20 is connected between those devices and the two-wire communication bus. As an example, two proximity switches, 22 and 26, are connected through the intelligent multiple port interconnect system 20 to the communication bus. In addition, two photoelectric devices, 30 and 34, are connected to the intelligent multiple port interconnect system 20 as shown. Also shown in FIG. 1 is a smart limit switch 27 and another smart photoelectric device 29.

In a sensor actuator bus such as that illustrated in FIG. 1, devices 22, 26, 30 and 34 would merely provide a signal, on their respective signal, lines that represents their status. That signal is received by the intelligent multiple port interconnect system 20 and a data packet is formulated by it for transmission on the two-wire communication bus to the PLC 12. The use of an intelligent node device such as that identified by reference numeral 20 permits the sensor actuator bus of the present invention to be utilized with numerous devices without requiring that each of those devices be provided with the capability to formulate and transmit its own messages. Instead, the simple status of the devices connected to an intelligent node is received by it and subsequently transmitted to the PLC 12.

The arrangement shown in FIG. 1 is intended as an exemplary configuration of a plurality of devices connected in signal communication with a two-wire communication bus. Some of the devices, such as proximity detectors, 18 and 21, and photoelectric devices 14, 16 and 29 comprise intelligence in the form of a microprocessor that provides the capability to formulate and transmit messages to the two-wire communication bus. A smart pressure transducer 19 is also shown connected to the bus 10. The other devices shown in FIG. 1 are standard components which do not possess this message formulation capability. Those devices are connected to the two-wire bus through an intelligent node device 20 which formulate the messages for those devices. Each of the smart devices shown in FIG. 1 is connected to the bus 10 through a T-connector which is configured to permit the cable extending from each sensor to be quickly connected to the bus 10. It should be understood that the bus 10 comprises both the two-wire power bus and the two-wire communication bus. In addition, each of the T-connectors permits the interconnection of the bus 10 with two power leads and two signal leads extending between the T-connector and the sensor. This will be described in greater detail below in conjunction with FIG. 11.

In FIG. 1, photoelectric device 14 is shown with its attached cable 33 connected to bus 10 through T-connector 15, limit switch 27 is shown with its attached cable 35 connected to bus 10 through T-connector 25 and photoelectric device 16 is shown with its attached cable 31 connected to the bus 10 through T-connector 17. The other devices are similarly connected to the four-wire bus. All of the T-connectors are identical to each other and the relationship between the T-connector, the attached cable and the smart sensor will be discussed below in conjunction with FIG. 11.

With continued reference to FIG. 1, the proximity sensors connected to the two-wire communication bus through an intelligent multiple port interconnect system 20 component could be any standard proximity detector, such as those identified by MICRO SWITCH Catalog 50 (entitled "Specifier's Guide to Proximity Sensors") which are available in commercial quantities from the MICRO SWITCH Division of Honeywell Inc.. The photoelectric devices shown in FIG. 1 connected through an intelligent node component 20 to the two-wire communication bus can be those identified by MICRO SWITCH Catalog Number 60 (entitled "Specificer's Guide for Photoelectric Controls") which describes many different types of sensors which are available in commercial quantities from the MICRO SWITCH Division of Honeywell Inc.. Limit Switch 27 is of the type generally shown in MICRO SWITCH Catalog 40 which is entitled "Specifier's Guide for Limit & Enclosed Switches."

Figure 2:
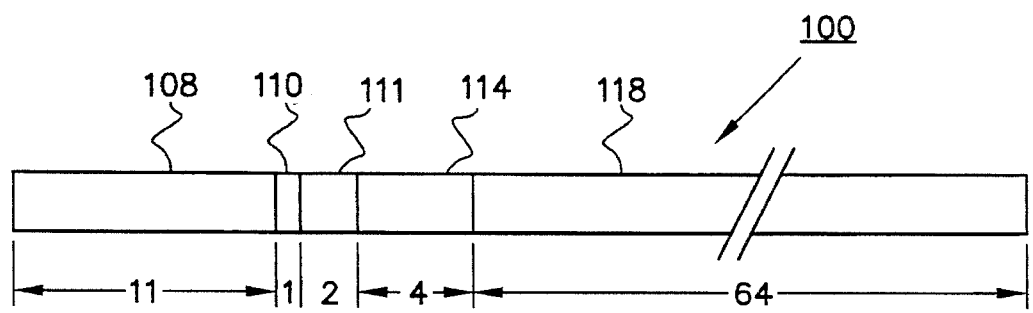
FIG. 2 shows a data packet used in a standard CAN protocol.
Figure 3:
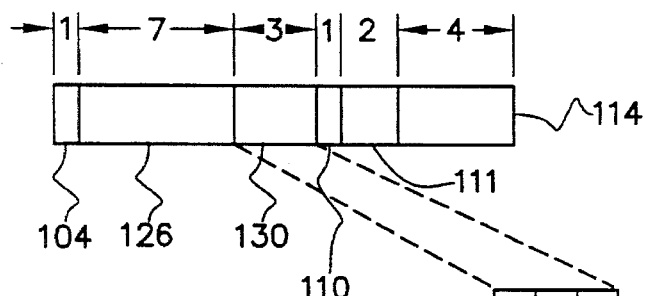
FIG. 3 shows a modified data packet in accordance with the present invention.

FIG. 2 illustrates an exemplary data stream such as the data packet provided in the standard CAN protocol. As will be described in greater detail below, some additional bits are included in all CAN protocol messages. However, for the purpose of comparing the present invention to a standard CAN protocol message, only the message portions are shown in FIGS. 2 and 3. The standard data packet 100 comprises eleven identifier bits 108. The identifier bits 108 contain a binary value that represents the priority assigned to a particular device in a two-wire communication bus system. Through the use of standard protocol arbitration techniques, the priority of the device contained in the identifier bits 108 determines the priority that will be applied to the transmission of messages on the bus. A single bit Remote Transmit Request (RTR) field 110 is used in the standard CAN protocol to request a transmission from a remote device.

Next, two bits 111 are reserved for use by the can system. A data length field 114 contains a binary value that represents the length of a message contained in the data field 118. The data field 118 can comprise a maximum length of eight bytes of information and the data length field 114 contains a binary value that represents the number of bytes in the data field 118.

As will be described below in conjunction with FIG. 10, a message utilizing the standard CAN protocol must comprise a length which is at least fifty-two bits long, not including certain other necessary bits which will be described in greater detail below. In that minimum case, the data length field 114 would contain a binary one and the data field 118 would comprise one byte. This represents a minimum message length of fifty-two bits.

FIG. 3 represents a data packet configured in accordance with the present invention. The first bit is utilized as a direction bit 104. This dedication of the first bit as a direction bit is made so that the present invention can identify the direction of transmissions to and from the identified device. Instead of the eleven-bit identifier field 108, the present invention utilizes those eleven bits for three distinct purposes: a direction bit, a device identifier field 126 and a short form protocol data unit (PDU) 130. The device identifier field 126 comprises a group of seven bits. While reducing the total number of device identifiers that could otherwise be contained in a standard identifier field 108, the smaller identifier field 126 of the present invention makes available three bits for use as a short form protocol data unit (PDU) 130. Also shown in FIG. 3 is a detailed illustration of the types of codes that can be stored in the three-bit short form protocol data unit (PDU) 130. For example, if a value of zero is contained in the short form PDU 130, the message means that the device identified in field 126 experienced a change of state from an on condition to an off condition. This is represented in FIG. 3 as a change of state (COS) to off, or "COS OFF". Similarly, if the binary value of the short form PDU 130 is equal to one, the message represents a change of status from an off condition to an on condition, or "COS ON". Both of the two change of status messages described immediately above would typically be transmitted in a data packet from a device to a central controller, such as the PLC 12 illustrated in FIG. 1. However, if should also be understood that this type of message could also be transmitted from the device identified in the device identifier field 126 to any other device that has been preprogrammed to react to a message from the device identifier in field 126. For example, an actuator could be programmed to respond to a change of state of a predefined sensor.

It should be understood that the specific three-bit combinations shown in FIG. 3 for the short form PDU 130 are exemplary and could be rearranged in alternative embodiments of the present invention. The three bits in the short form PDU 130 allow eight distinct messages to be transmitted from one device to another through the use of the present invention. While the particular meaning of any specific three bit combination is not critical to the present invention, the use of the short form PDU 130 is an important element of the present invention which provides its most significant advantage which is the brevity of the message and the resulting speed of transmission on the bus.

With continued reference to FIG. 3, it can be seen that the short form PDU 130 can also be used to transmit messages from the PLC 12 to the device identified in field 126. If the PLC 12 receives a message from the device identified in field 126 that it experienced a change of status, the PLC can acknowledge receipt of the message by sending a return message (e.g. "COS OFF ACK" or "COS ON ACK") containing the device identifier in field 126 and appropriately setting the direction bit 104 to represent a message to that identified device. The short form PDU 130 would then be set to either a binary two or a binary three to represent acknowledgment of the change of state message. As can be seen, only 11 bits are necessary in the modified CAN protocol described immediately above. However, in order to conform with the standard CAN protocol, the RTR field 110 and the four-bit data length field 114 are set to zero and the total sixteen bit field is transmitted as a full two-byte message. However, it should also be noted that no data field 118 is necessary in the normal use of the abbreviated CAN protocol provided in accordance with the present invention.

As described above, it is important that the abbreviated protocol provided by the present invention be compatible with the standard CAN protocol so that control systems can incorporate the standard CAN protocol for use in those particular circumstances when abbreviated status messages do not suffice for all situations. In other words, if it is desirable that an industrial automation system be capable of transmitting fault messages, other types of messages or analog values, the use of a three-bit short form PDU such as that identified by reference numeral 130 in FIG. 3 is not appropriate. Therefore, for those situations in which an expanded message transmission capability is necessary, the three-bit short form PDU 130 can be used to identify a condition in which the data field 118 is also incorporated in the data packet. Those conditions can be identified by setting the most significant bit in the short form PDU 130 to a value of one. Those conditions are also represented in the table of FIG. 3 in which a binary value of four in the short form PDU 130 represents a read instruction, a binary value of five represents a write instruction, a binary value of six represents the identification of an action and a binary value of seven identifies an event. In these four exemplary situations, the data field 118, as shown in FIG. 2, could also be transmitted and would contain additional information relating to the read, write, action or event transmission. In addition, the data length field 114 would be used to identify the number of bytes contained in the data field 118. This optional use of the present invention emulates the standard CAN protocol which is well known to those skilled in the art.

Figure 4:
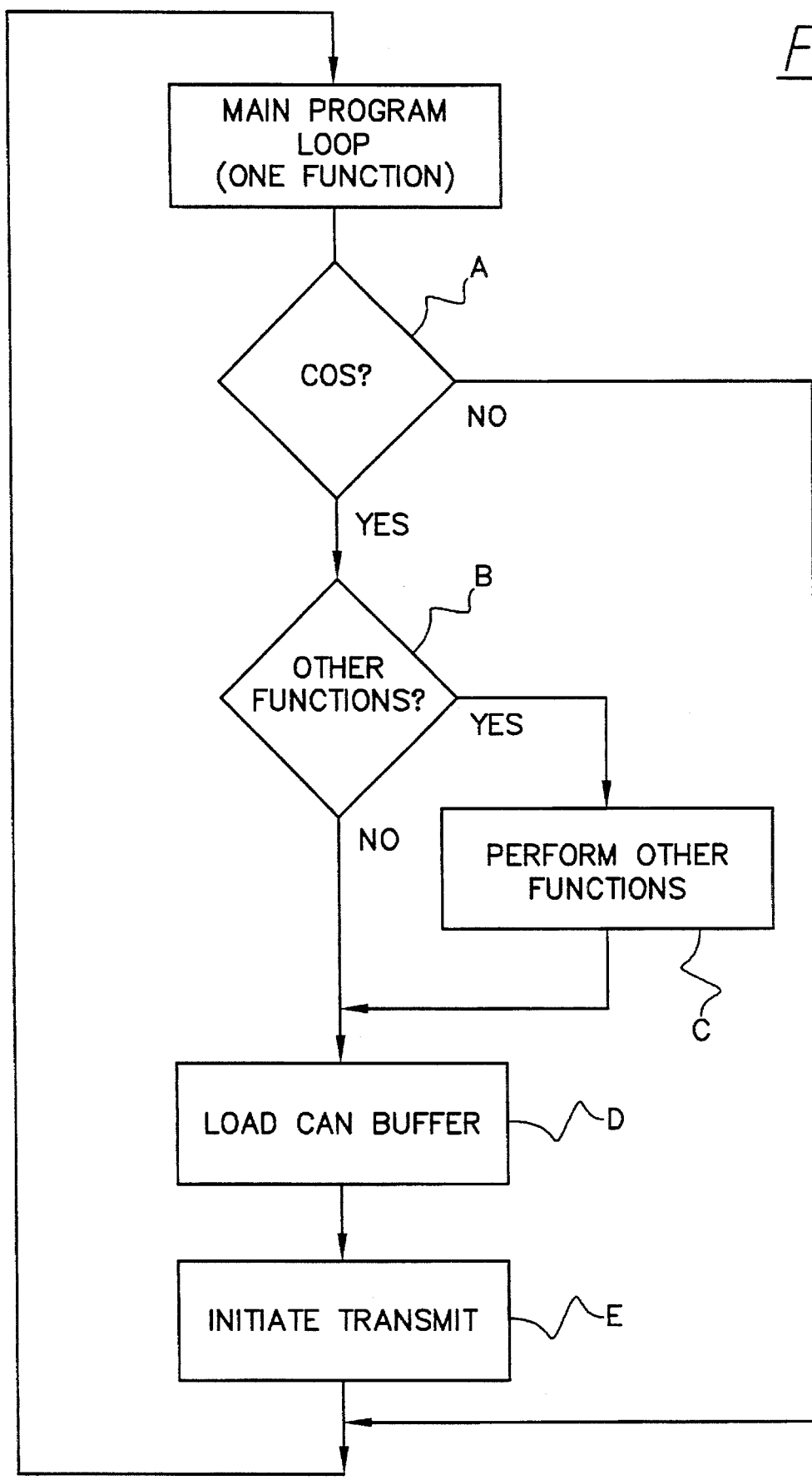
FIG. 4 shows an exemplary flowchart that could be used to configure a data packet in accordance with the present invention.

It should be understood that each smart sensor connected in signal communication with the sensor actuator bus of the present invention comprises means for formulating and transmitting data packets to the two-wire communication bus. In a typical application of the present invention, a microprocessor would be used as the means for formulating the data packet. FIG. 4 shows a portion of an exemplary flowchart that would be followed by the microprocessor in a smart sensor when a change of state (COS) has occurred in the sensor. An interrupt would cause a status flag to be set when a change of state has occurred. This is not indicated in the flowchart of FIG. 4. The flowchart continually cycles to check various status flags. For example, at function block A, the microprocessor checks to see if a flag has been set to indicate that a change of state (COS) has occurred in its sensing element. If no change of state has occurred, the program jumps to its end and cycles again. If, on the other hand, a change of state has occurred, the program checks to see if other functions must also be performed with the change of state. If it is necessary to perform other functions, as determined by function block B which would interrogate an appropriate flag, the program performs those functions as indicated by function block C such as a login inversion for normally closed devices, a delay to accommodate a debounce algorithm, on or off delays, motion detection, batch counting or on/off only operation. Then, as indicated by function block D, the microprocessor formulates its CAN protocol buffer, which is referred to herein as the data packet, and transmits that formulated information to a CAN protocol chip as indicated by function block E. Although not indicated in FIG. 4, it should be understood that the microprocessor in the sensor could also determine its own condition and report that condition in a diagnostic message. That option will be discussed in greater detail below, but the flowchart in FIG. 4 represents the type of logic that would be performed by a microprocessor in a sensor made in accordance with the present invention for determining its change of status and reporting that change of status through the use of a short form PDU to take advantage of the enhanced speed characteristics of the present invention.

The means for transmitting a data packet to the two wire communication bus can be any one of the several devices identified below in conjunction with the discussion of FIG. 5. For example, a Motorola CAN module includes all hardware modules that are necessary to implement the CAN transfer layer, which represents the kernel of the CAN bus protocol as defined by Bosch GmbH who originated the CAN specification. The Motorola CAN module comprises a transmit buffer which operates as an interface between a CPU and a bit stream processor. The transmit buffer is able to store a complete message. In addition, the module comprises a receive buffer which operates as a interface between the bit stream processor and the CPU and stores a message which is received from a bus. The Motorola CAN module handles all communication transactions flowing across a serial bus. For example, the CPU can place a message to be transmitted into the transmit buffer and then set a TR bit. The module begins transmitting the message when it has determined that the bus is idle. The data packet is transmitted from the microprocessor to the CAN protocol chip, or module, as an eight-bit parallel communication with each byte of the data packet being transmitted in sequence from the microprocessor to the CAN protocol chip until the entire message is transmitted. The CAN protocol chip, or module, then transmits the data packet serially to the bus to generate the bit stream described above in conjunction with FIGS. 2 and 3 and, as will be described below, in conjunction with FIGS. 9 and 10.

Figure 5:
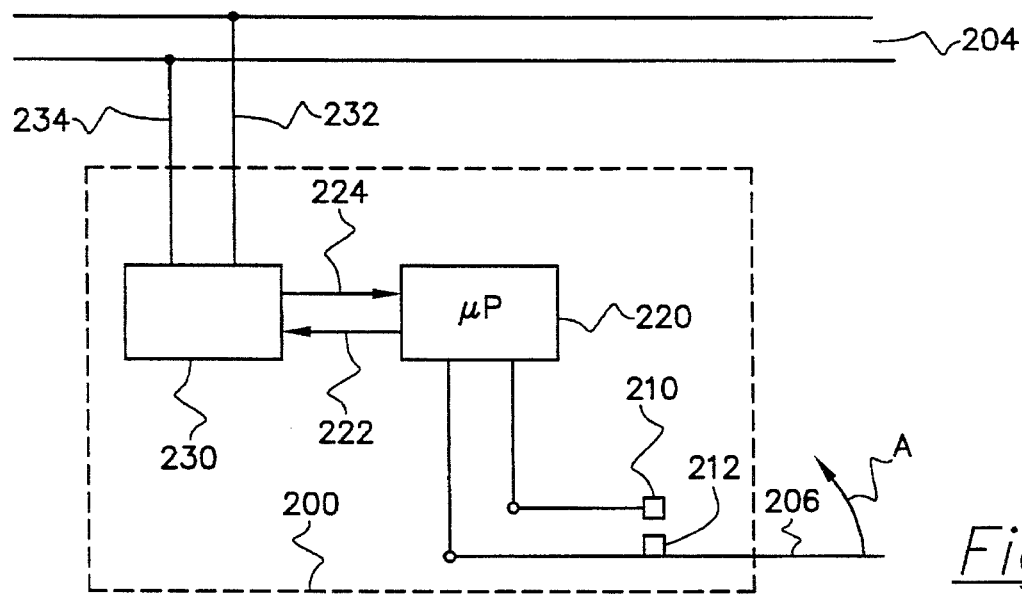
FIG. 5 shows an exemplary limit switch incorporating the concepts of the present invention.

FIG. 5 shows an exemplary illustration which depicts a smart limit switch 200 connected to a two-wire communication bus 204. It should be understood that the illustration of FIG. 5 is highly schematic and presented only as an example of how a device can be configured for association with a two-wire communication bus in accordance with the present invention. In a manner well known to those skilled in the art, a switch actuator 206 can be used to close a pair of contacts, 210 and 212, when the switch actuator 206 moves in the direction represented by arrow A. The closure of those two contacts can be sensed as inputs to a microprocessor 220. The microprocessor can respond to the change of state of the smart limit switch 200 by formulating a data packet and providing the data packet information, on lines 222 and 224, to a CAN protocol chip 230 as described above. Although the connection between the microprocessor and the CAN protocol chip is represented by two lines in FIG. 5, it should be understood that the data is transmitted between the microprocessor and the CAN protocol chip in a parallel fashion as discussed above. The steps shown in the flowchart of FIG. 4 could be followed to formulate and transmit the information to the chip 230.

The chip identified by reference numeral 230 can be obtained from several sources that are well known by those skilled in the art. For example, devices identified by numbers 80C200 and 80C592 are available in commercial quantities from the Philips Corporation, devices identified by numbers MC68HC05X4 and MC68HC705X4 are available in commercial quantities from the Motorola Corporation and a device identified by number 80C526 is available in commercial quantities from the Intel Corporation. It should be understood that some devices of this kind are combined with microprocessors. The function of these devices is to receive a formulated data packet from another component, such as a microprocessor, and then transmit the information to the communication bus.

Figure 6:
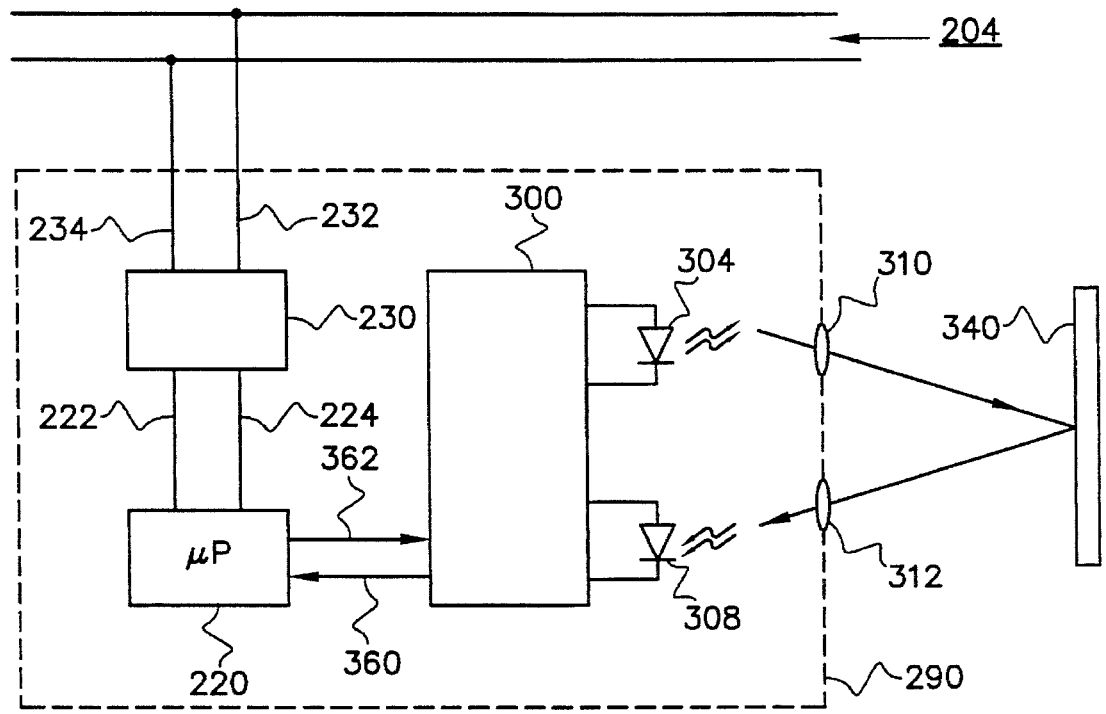
FIG. 6 shows an exemplary photoelectric device incorporating the concepts of the present invention.

FIG. 6 shows an exemplary illustration of a smart photoelectric device connected in signal communication with a two-wire communication bus 204. Since photoelectric devices are very well known to those skilled in the art, the circuitry 300 of the device will not be described herein. However, the schematic illustration of the smart photoelectric device 290 shows a light emitting component 304 and a light sensitive component 308 arranged to transmit and receive light, respectively, through appropriate lens, 310 and 312. In a typical application, a reflective surface 340 is used to reflect light, emitted by the light emitting component 304, back toward the light sensitive component 308. If an object is present between the light emitting component 304 and reflective surface 340, the lack of light of received by the light receiving component 308 will be sensed by circuitry 300 in a manner that is well known to those skilled in the art. The status of circuitry 300 can be communicated, on lines 360 and 362, to the microprocessor 220 which provides that information to the CAN protocol chip 230 in the manner described above in conjunction with FIG. 5.

Figure 7:
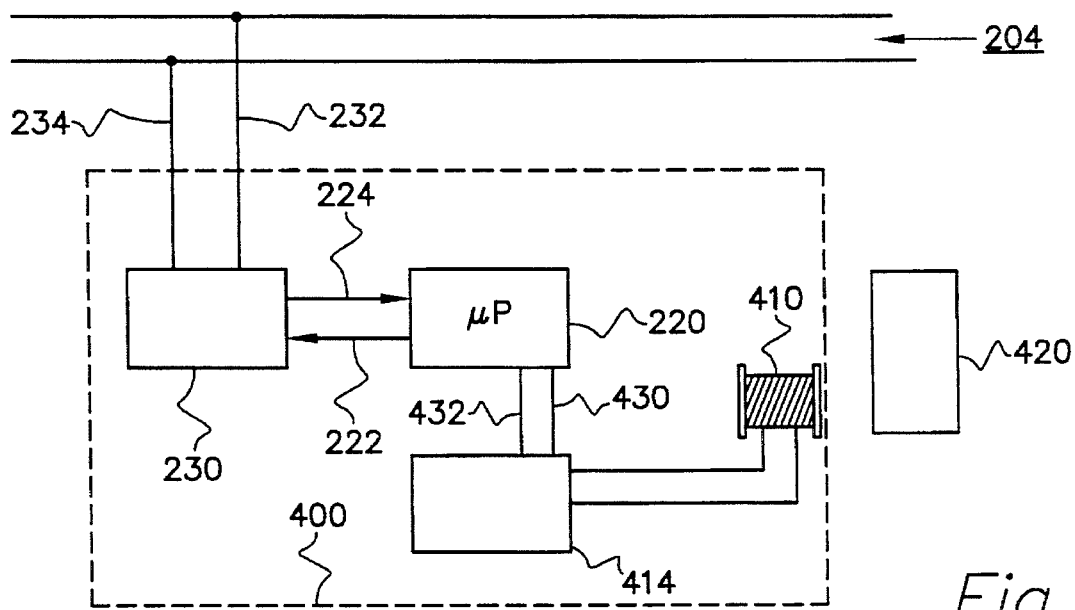
FIG. 7 shows an exemplary proximity sensor incorporating the concepts of the present invention.

FIG. 7 shows how an exemplary proximity sensor 400 can be configured to operate in accordance with the present invention. As is well known to those skilled in the art, a proximity sensor would incorporate a coil 410 in association with appropriate circuitry 414. When an object to be sensed, such as that schematically illustrated in FIG. 7 and identified by reference numeral 420, moves within a predetermined range of coil 410, its presence is detected by circuitry 414. This condition can be communicated, on lines 430 and 432, to the microprocessor 220 which would formulate an appropriate change of state message and provide that information, on lines 222 and 224, to the CAN protocol chip 230 for transmission to the two-wire communication bus 204.

Figure 8:
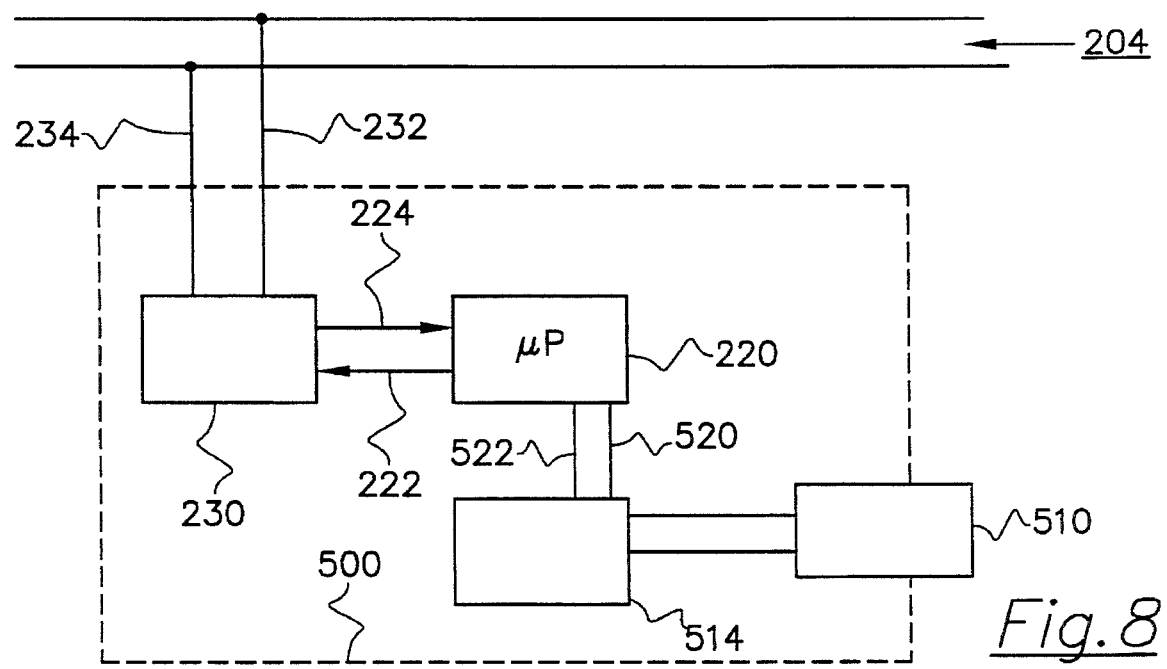
FIG. 8 shows an exemplary temperature sensor incorporating the concepts of the present invention.

FIG. 8 is an exemplary illustration of a temperature sensitive device 500 adapted for use in association with the present invention. A temperature sensitive probe 510 is connected in signal communication with appropriate circuitry 514 to provide a signal, on lines 520 and 522, to the microprocessor 220. In a manner similar to that described above, the microprocessor would formulate a message and transmit that message to the CAN protocol chip 230 which has been described above. It should be realized that circuitry 514 can be adapted to form two distinct alternative functions. In a manner which is well known to those skilled in the art, the circuitry 514 can report the actual temperature of the probe 510 to the microprocessor 220. In this circumstance, the microprocessor could formulate a standard CAN protocol data packet containing the analog value of the temperature in the data field identified by reference numeral 118 in FIG. 2. Alternatively, the circuitry 514 could first compare the temperature of the probe 510 to a predetermined threshold magnitude to determine whether or not that temperature exceeds the threshold. In this type of application, either circuitry 514 or the microprocessor 220 would compare the temperature to the threshold and provide a yes or no decision regarding the relative magnitudes of the temperature and threshold value. That status would then be reported to the two-wire bus 204 through the use of the present invention in which a modified protocol would require only two bytes of information to transmit the change of status condition to the two-wire communication bus 204.

With reference to FIGS. 5, 6, 7 and 8, it should be clearly understood that these figures represent schematic illustrations that are highly simplified for the purpose of showing the ways in which standard components, such as limit switches, proximity sensors, photoelectric devices and temperature sensors, can be incorporated in smart devices that are capable of formulating data packets containing the appropriate message made in conformance with the concepts of the present invention. Those formulated messages would be transmitted to a CAN protocol chip 230, in a manner that is well known to those skilled in the art, and then subsequently transmitted to the two-wire communication bus by the chip 230 in a manner that is also well known to those skilled in the art. As described above, the CAN protocol chip 230 is available in commercial quantities and has been used in association with communication systems that incorporate the standard CAN protocol.

As mentioned above, the complete digital transmission required by the CAN protocol includes additional bits whether the present invention or the standard CAN protocol is used. However, it should be realized that the present invention provides a significantly shorter transmission even when these additional bits are considered. This advantage is shown in FIGS. 9 and 10 where both transmissions are shown in their minimum length configurations.

Figure 9:
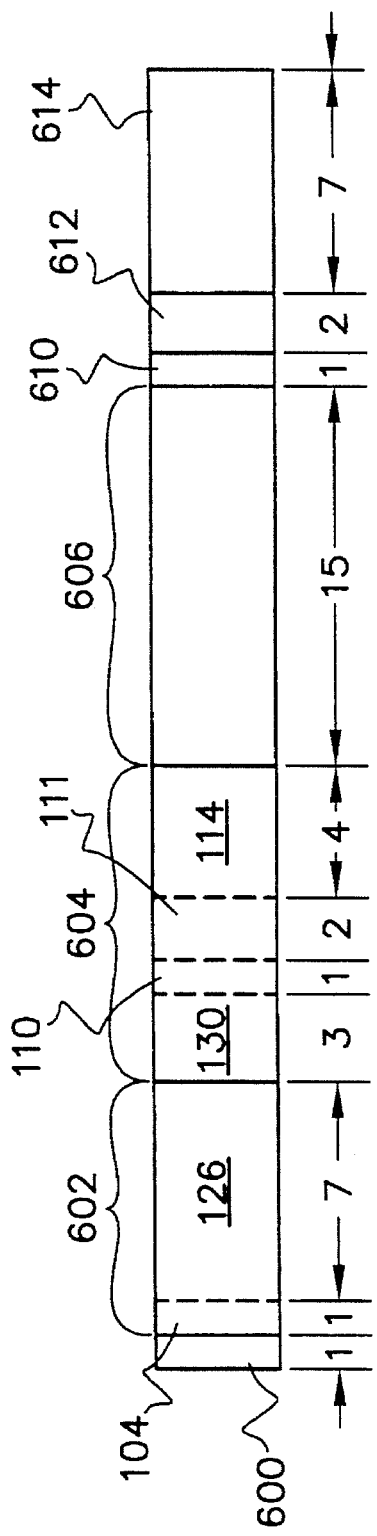
FIG. 9 illustrates the full length of a data transmission using the shortened form of the standard CAN protocol in accordance with the present invention.

FIG. 9 shows a complete transmission of a message formulated and configured in accordance with the present invention. The first bit 600 is a start bit provided for the purpose of synchronizing the start of transmission. The next field 602 is an arbitration field of eight bits that comprises the single direction bit 104 and a seven bit identifier or priority, field 126. A control field 604 comprises the three bits of the short form PDU 130, the RTR bit 110 the two reserved bits 111 and the data length code field 114. Reference numeral 606 identifies a Cyclic Redundancy Check (CRC) field of fifteen bits that serves the purpose of error detection and correction.

With continued reference to FIG. 9, a single bit CRC delimiter 610 is used to signal the end of the CRC field 606 and another two bit acknowledge field 612 is used to acknowledge the receipt of a message. The last seven bits of the total message shown in FIG. 9 is the end of Frame, or EOF, field 614 which serves the purpose of signifying the end of a bit stream. It should be clearly understood that the digital information contained in fields 600, 606, 610, 612 and 614 are necessary to comply with the requirements of the CAN protocol, but do not directly relate to the present invention. Instead, the present invention relates directly to the formulation of data fields 602 and 604 which permit the sensor information to be transmitted in a way that is shorter, and therefore faster, than is contemplated by the standard CAN protocol.

Figure 10:
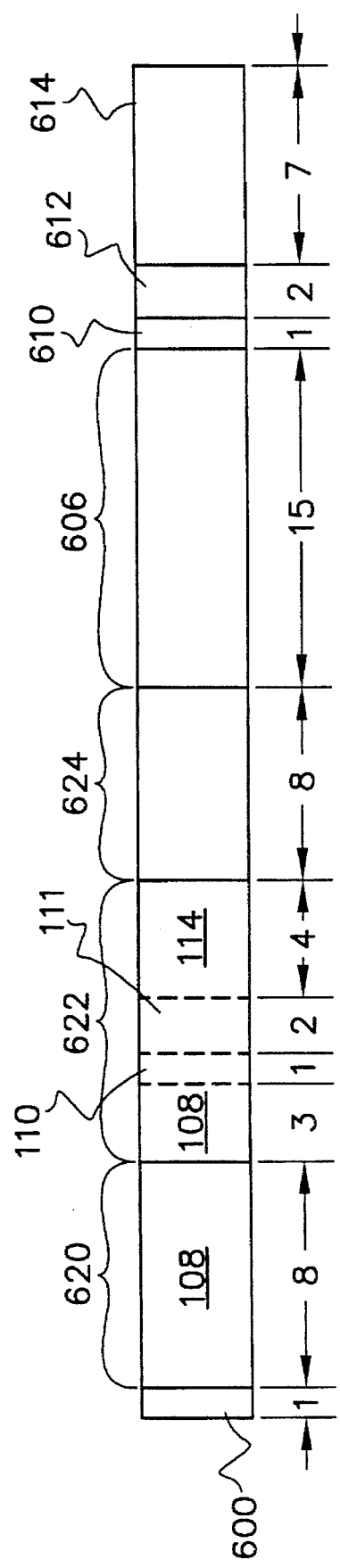
FIG. 10 shows a full length data transmission using the standard CAN protocol.

FIG. 10 shows a standard CAN protocol transmission configured in its minimum length. Fields 600, 606, 610, 612 and 614 are identical to the corresponding fields shown in FIG. 9 and described above. The eight bits of field 620 and the first three bits of field 622 provide the eleven bit priority, or identifier, information 108 in the standard CAN protocol.

The RTR field 110 and the data length field 114 are similarly configured as the corresponding fields shown in FIG. 9. However, while the data length field 114 is not used in the present invention, it is used by the standard CAN protocol to define the length of the data field that comprises at least one byte 624 that is required to transfer sensor information if the standard CAN protocol is used. The minimum data field 624 is one byte and, by comparing FIGS. 9 and 10, it can be seen that this illustrates one very significant advantage of the present invention. The shortened message of the present invention shown in FIG. 9 results from the fact that it eliminates the need for data field 624 by its use of reconfigured fields 602 and 604. In other words, data fields 602 and 604 are used by the present invention instead of data fields 620, 622 and 624 in the standard CAN protocol for the purpose of transmitting messages to the two-wire bus representing changes of state of the smart sensor and acknowledges of those changes of state.

It should be clearly understood that FIG. 10 represents the minimum length of a message configured for transmission in accordance with the standard CAN protocol if a plurality of devices are each to have the capability of providing a plurality of messages. This permits a comparison of the present invention to the shortest possible transmission than can be accomplished by the standard CAN procedure under the circumstances described above. A data transmission using the standard CAN protocol requires fifty two bits, as shown in FIG. 10, whereas the present invention requires only forty-four bits, as shown in FIG. 9. Both of the transmissions relate to the status of a plurality of simple devices such as a limit switch, proximity sensor or photoelectric device. Therefore, the present invention utilizes a bit stream that is only 84.6% of the length of the bit stream shown in FIG. 10. This reduction in message length permits an increase of 18.2% in the number of transmissions that can be accomplished in a given period of time.

The advantages of the present invention permit a sensor actuator bus, comprising a plurality of devices which each have a plurality of possible messages, to be used in applications where increased speed is a necessity. For example, if a photoelectric device is used to detect the occurrence of an object passing a predefined position so that a conveyor can be stopped at the proper time, the present invention permits the operation of the overall system to be improved. If, for example, the object is moving at a rate of 120 inches per second and each bit of a message requires one millisecond to transmit, the difference in speed resulting from the shortened message of the present invention is equivalent to 1,032 inches of travel of the object. In applications where objects move at even higher speeds, the advantage can be even more significant.

In certain industrial applicants, many sensors work in coordination with many actuators to control the operation of a complex manufacturing process. If the number of sensors and actuators is large enough, the transmission of signals from the sensors and to the actuators can severely tax the capabilities of the control system by increasing its duty cycle to the point where transmissions on a serial bus experience delays. Although an analysis of this type of problem is highly complex, it can easily be appreciated that the reduction of transmission time by more than 15% for each sensor status message can significantly alleviate this problem and improve the operation of the manufacturing process.

While the possible applications of the present invention extend far beyond the examples described above, it can be seen that its use reduces the length of a data transmission message and therefore reduces the time required to transmit the message on a serial communication bus. Although this increased speed is the most apparent advantage of the present invention, its compatibility with a standard CAN protocol permits this speed increase to be achieved without sacrificing the normal capabilities inherent in the CAN protocol. This permits the status of a sensor to be transmitted on the communication bus with the increased speed of the present invention while also permitting slower more complex transmissions when they are required. For example, analog values can be communicated from a sensor to a PLC by using the standard CAN protocol. These longer messages would use the data field 624 that is not required for the short form PDU messages of the present invention. The longer messages could represent analog values, diagnostic messages or even the catalog identification describing a sensor that is connected to the bus to assist in replacement of the sensor.

Figure 11:
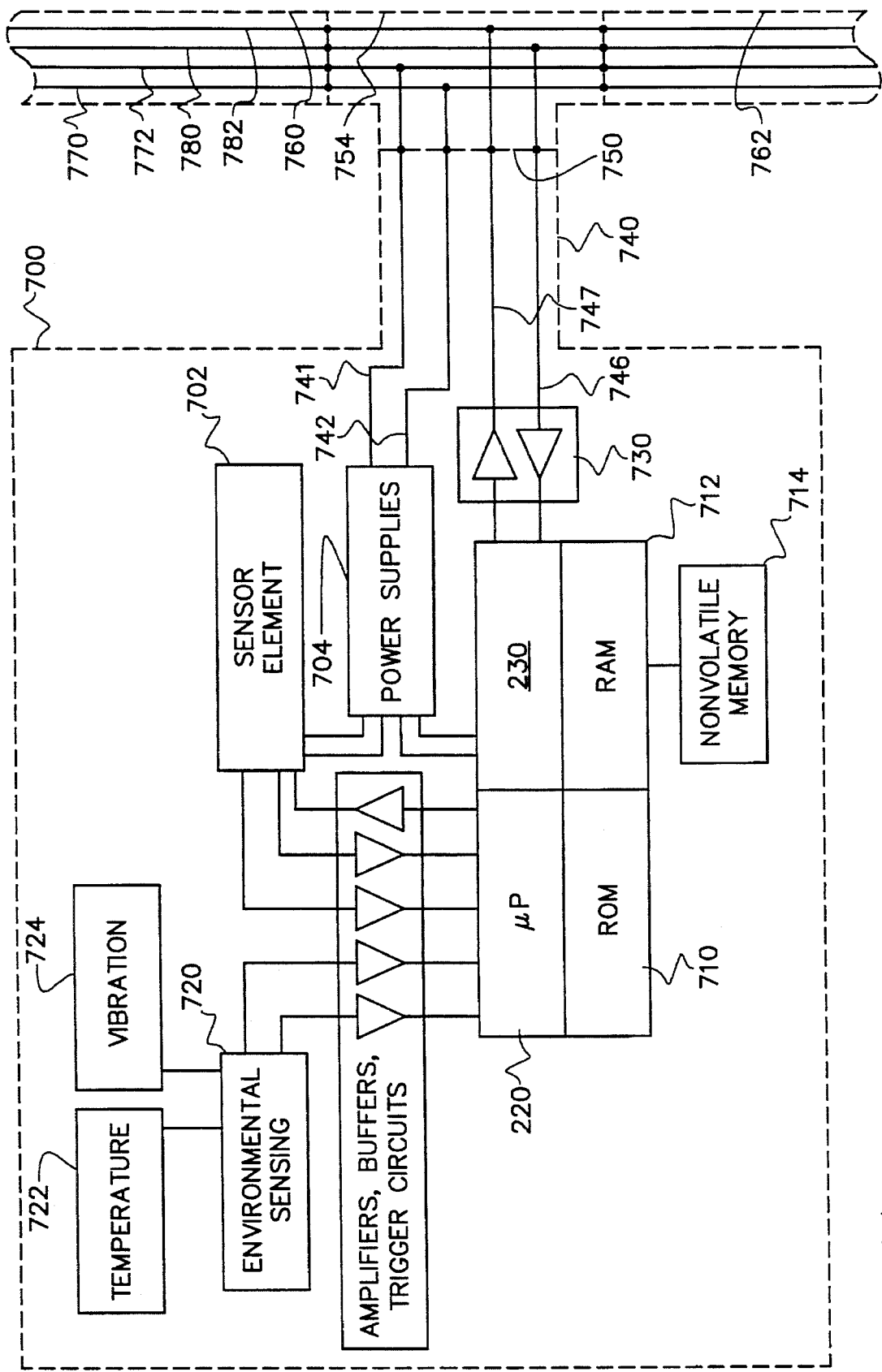
FIG. 11 shows an exemplary smart sensor connected in signal communication with a two-wire power bus and a two-wire communication bus.

FIG. 11 shows a smart sensor, made in accordance with the present invention, connected to a four-wire bus. The smart sensor 700 is illustrated as a dashed line representing the housing of a single sensor. The sensor 700 comprises a sensing element 702. It should be understood that the sensing element 702 could alternatively be a limit switch, photoelectric device, proximity detector, temperature sensor or virtually any other type of sensing element that can provide a signal representing a particular characteristic of the environment surrounding the sensor. The sensor 700 also comprises at least one power supply 704 that receives power from an external source and provides power at the required voltage potential for the various components within the housing of the sensor. As described above, the sensor 700 comprises a microprocessor 220 which provides a means for formulating messages and, in particular, data packets that contain information relating to the status of the sensing element 702. Also included within the housing of the sensor is a CAN protocol chip 230 as described above. In certain applications of the present invention, read-only-memory (ROM) 710 is provided for use in association with the microprocessor 220. In addition, random-access-memory (RAM) 712 and nonvolatile memory 714 are provided to enhance the overall capability of the microprocessor to communicate with other devices on the communication bus.

One particular advantage of the present invention is that the smart sensor 700 can recognize problems occurring within its sensing element and related circuitry. In addition, a smart sensor made in accordance with the present invention can monitor its own environment and determine when circumstances dictate that an inspection should be performed. For example, using an internal temperature sensor 722 or a vibration detection mechanism 724, such as an accelerometer, the sensor can monitor certain predefined conditions that could adversely affect its ability to operate properly. This information can be received by an environmental sensing unit 720 and reported to the microprocessor 220. Although not absolutely necessary in every application of the present invention, the environmental testing capability permits correction of adverse conditions before serious damage is done to the unit. Transceiver circuitry 730 is provided between the CAN protocol chip 230 and the outside environment.

The smart sensor 700 is provided with an attached cable 740 which comprises four wires therein. Two of the wires, 741 and 742 are power conducting wires and two of the wires, 746 and 747, are signal wires. The cable 740 is attached to the sensor housing and can be virtually any convenient length. The cable 740 terminates at a point identified by reference numeral 750. It should be understood that an appropriate termination connector would be provided at the distal end of cable 740 although no such connector is illustrated in FIG. 11. The connector can be virtually any type of suitable five-pin connector for connecting the four wires and the cable shield to another similarly configured connector. The cables in FIG. 11 are all illustrated as dashed lines to permit the more illustrative schematic representations to be used for the purpose of discussing the interconnections of the various wires in the Sensor Actuator Bus.

The cable 740 extending from the sensor 700 is connected to a T-connector 754 which shares a common interface with the end of the cable 750 when the two are connected together. The other two connection portions of the T-connector 754 are connected to cable segments 760 and 762. Each of the interface portions of the T-connector 754 is provided with a four-pin connector as described above. Within the cable segments, 760 and 762, a four-wire bus is provided as shown. Two of the wires make up a two-wire power bus comprising wires 770 and 772. The other two wires, 780 and 782, make up a two-wire communication bus. Although only one T-connector and one sensor is illustrated in FIG. 11, it should be understood that a plurality of sensors with attached cables can be connected to the sensor actuator bus using a plurality of T-connectors as shown in FIG. 11. Each of the sensors would comprise a two-wire signal bus that is connected in parallel with the remaining plurality of sensors to the two-wire communication, or signal, bus of the cable.

As can be seen in FIG. 11, wire 741 of sensor 70 is connected in electrical communication with wire 772 of the four-wire cable and wire 742 of sensor 700 is connected in electrical communication with wire 770 of the four-wire bus. This permits the sensor to be provided with electrical power necessary for its operation. Many other sensors which are similarly configured to sensor 700 can be connected in parallel with sensor 700 to the power bus comprising wires 770 and 772. Wire 746 is connected in signal communication with wire 780 and wire 747 is connected in signal communication with wire 782 of the bus. This permits the CAN protocol chip 230 to be connected in signal communication with the four-wire bus. The sensor 700 would therefore be connected in parallel with a plurality of sensors that are similarly connected to the bus through the use of a T-connector.

With reference to FIG. 1 and FIG. 11, it can be seen that the T-connector 754 in FIG. 11 is connected to the bus segments, 760 and 762, in a manner similar to the way that T-connectors 15, 17 and 25 are connected to bus 10 in FIG. 1. It is anticipated that the sensor actuator bus made in accordance with the present invention would actually comprise a plurality of cable segments, such as the segments between T-connectors 15 and 25 and between T-connectors 25 and 17 in FIG. 1. Each of the cable segments would comprise a four-wire bus encapsulated by an insulative material and provided with a five-pin connector at each end. By attaching a plurality of these cable segments to a plurality of T-connectors, an arrangement such as that shown in FIG. 1 could easily be configured. In a preferred embodiment of the present invention, each sensor would have its own cable attached to it in the manner described above in relation to cable 740 which is attached to sensor 700 in FIG. 11. This is similar to the illustration of the cable segments 31, 33 and 35 which are attached directly to photoelectric device 16, photoelectric device 14 and limit switch 27, respectively, in FIG. 1. Cables and connectors of this type are available in commercial quantities from the Daniel Woodhead Company.

With continued reference to FIGS. 1 and 11, it can be seen that the present invention provides a sensor actuator bus that is particularly well adapted for use in industrial environments where sensors must be disposed at positions that are significantly distant from other sensors connected to the same bus. It also provides a two-wire communication system in which a plurality of smart sensors can communicate with a central controller, such as a PLC, and transmit information ranging from simple messages that inform the controller of the status of the sensor to more complex messages that provide diagnostic information, analog values of measured parameters or catalog numbers of the sensor itself so that ease in replacement is facilitated. As described above, a smart sensor made in accordance with the present invention can also monitor its own environment to determine if conditions are not appropriate for its operation. Although not described in significant detail above, a sensor made in accordance with the present invention can also monitor its own operation to determine whether or not its internal signals are only marginally within specification even though the sensor is operating in an acceptable manner. This permits the smart sensor to predict its own failure and diagnose this condition.

Replacing a sensor on the bus is easily accomplished by merely disconnecting the sensor's attached cable from its associated T-connector and replacing it with a new sensor and attached cable. Adding a sensor to the system is also relatively easy and can be accomplished by merely breaking a connection between a cable segment of the bus and an associated T-connector and inserting an additional cable segment and an additional T-connector in series with the original sensor actuator bus. This additional T-connector permits another sensor to be added to the system.

Although the present invention has been described with particular reference to various types of sensors, it should be clearly understood that actuators can also be used in association with the sensor actuator bus. For example, a valve for an air cylinder can replace the sensor element in FIG. 11 and be controlled by messages received from a PLC and interpreted by the microprocessor 220. In operation, data packets would be sent from the PLC with the identifier of the actuator contained in the priority field. The direction field would be set to indicate the message is intended for receipt by the identified sensor. The CAN protocol chip 230 would receive the transmission from the two-wire communication bus and the microprocessor 220 would interpret the data packet to determine that an actuation had been commanded by the PLC.

The present invention also permits communication between sensors on a sensor actuator bus without intervention by the PLC. For example, if a particular adaptation of the sensor actuator bus requires that an actuator be caused to operate immediately when a particular sensor recognizes a predefined condition, the sensor can communicate directly to the actuator when the predefined condition occurs and the actuator can take immediate action in response to receipt of that information.

Although the present invention has been described in significant detail and has been specifically disclosed in terms of particular examples, it should be understood that the concept of the present invention includes many other applications within its scope.

The embodiments of the invention in which an exclusive property or right is claimed are defined as follows:

1. A sensor actuator bus, comprising:

a four-wire bus comprising a two-wire power bus and a two-wire communication bus;

a plurality of sensors, each of said sensors being connected to said two-wire power bus and to said two-wire communications bus, said two-wire power bus and said two-wire communications bus being disposed in a common cable, each of said plurality of sensors comprising a means for formulating a data packet containing information representing a status of said sensor associated with said formulating means and a means for transmitting said data packet on said two-wire communication bus, each of said sensors being connected in signal communication with said two-wire communications bus and connected in electrical communication with said two-wire power bus, said transmitting means being connected in signal communication with said formulating means, said data packet comprising a direction bit, seven priority bits for identifying an associated sensor and three message bits, said data packet being arranged in conformance with a Controller Area Network protocol system.

2. The sensor actuator bus of claim 1, wherein:

said formulating means comprises a microprocessor.

3. The sensor actuator bus of claim 1, wherein:

said plurality of sensors comprises at least one limit switch.

4. The sensor actuator bus of claim 1, wherein:

said plurality of sensors comprises at least one proximity detector.

5. The sensor actuator bus of claim 1, wherein:

said plurality of sensors comprises at least one photoelectric device.

6. A sensor actuator bus, comprising:

a two-wire communication bus;

a two-wire power bus;

a first sensor connected in signal communication with said two-wire communication bus;

first means, disposed within said first sensor, for formulating a first data packet representing a direction of communications, a prioritized identity of said first sensor and a status of said first sensor;

first means, disposed within said first sensor, for transmitting and receiving a first serial bit stream on said two-wire communications bus, said first serial bit stream comprising information contained in said first data packet, said first transmitting means being connected in signal communications with said first formulating means, said first transmitting means being connected in signal communications with said two-wire communications bus, said first formulating means being connected in signal communications with a first sensing component of said first sensor;

a second sensor connected in signal communication with said two-wire communication bus;

second means, disposed within said second sensor, for formulating a second data packet representing a prioritized identity of said second sensor and a status of said second sensor;

second means, disposed within said second sensor, for transmitting and receiving a second serial bit stream on said two-wire communications bus, said second serial bit stream comprising information contained in said second data packet, said second transmitting means being connected in signal communications with said second formulating means, said second transmitting means being connected in signal communications with said two-wire communications bus, said second formulating means being connected in signal communications with a second sensing component of said second sensor, said first and second data packets being formulated in accordance with a Controller Area Network protocol; and a two-wire power bus connected in power transmission relation with said first and second sensors, said two-wire power bus being disposed in common sheath with said two-wire communication bus to form a four-wire bus.

7. A sensor actuator bus, comprising:

a four-wire bus comprising a two-wire power bus and a two-wire signal bus, said four-wire bus being contained in a common cable;

a T-connector connected to said four-wire bus and to said connecting means;

a programmable logic controller connected in signal communication with said two-wire signal bus;

a sensor comprising a sensing element, a microprocessor and means for transmitting and receiving a serial message, said microprocessor being connected in signal communication with said transmitting means, said microprocessor being connected in signal communication with said sensing element; and means, attached to said sensor, for connecting said transmitting means in signal communication with said two-wire signal bus and for connecting said microprocessor and said transmitting means in power transmission relation with said two-wire power bus, said microprocessor comprising means for formulating a data packet containing information relating to the status of said sensing element, said data packet being configured in accordance with a Controller Area Network protocol, said sensing element, said microprocessor and said transmitting means being contained within a common sensor housing, said data packet comprising a direction bit, seven priority bits for identifying an associated sensor and three message bits.

8. The sensor actuator bus of claim 7, wherein:

said sensing element is a limit switch.

9. The sensor actuator bus of claim 7, wherein:

said sensing element is proximity sensor.

10. The sensor actuator bus of claim 7, wherein:

said sensing element is a photoelectric device.

11. The sensor actuator bus of claim 7, wherein:

said sensing element is a temperature sensor.

* * * * *